US00RE47807E

(19) United States
(12) Reissued Patent
Speight

(10) Patent Number: US RE47,807 E
(45) Date of Reissued Patent: *Jan. 7, 2020

(54) SYSTEM AND METHOD FOR CHANNEL TRANSPORT FORMAT ALLOCATION IN A WIRELESS COMMUNICATION SYSTEM

(71) Applicant: Guangdong OPPO Mobile Telecommunications Corp., LTD., Dongguan (CN)

(72) Inventor: Timothy James Speight, Bristol (GB)

(73) Assignee: Guangdong OPPO Mobile Telecommunications Corp., LTD., Dongguan (CN)

( * ) Notice: This patent is subject to a terminal disclaimer.

(21) Appl. No.: 15/170,512

(22) Filed: Jun. 1, 2016

Related U.S. Patent Documents

Reissue of:
(64) Patent No.: 7,366,094
Issued: Apr. 29, 2008
Appl. No.: 10/190,458
Filed: Jul. 5, 2002

U.S. Applications:
(63) Continuation of application No. 14/069,025, filed on Oct. 31, 2013, now Pat. No. Re. 46,040, which is a (Continued)

(30) Foreign Application Priority Data

Jul. 6, 2001 (GB) ..... 0116555.4

(51) Int. Cl.
*H04W 76/12* (2018.01)
*H04W 72/04* (2009.01)
*H04W 28/18* (2009.01)

(52) U.S. Cl.
CPC ..... *H04W 76/12* (2018.02); *H04W 28/18* (2013.01); *H04W 72/04* (2013.01)

(58) Field of Classification Search
CPC ... H04W 76/12; H04W 76/022; H04W 28/18; H04W 72/04; H04J 3/14; H04J 3/16
(Continued)

(56) References Cited

U.S. PATENT DOCUMENTS 6,148,209 A * 11/2000 Hamalainen ..... H04W 28/18 370/329
6,661,777 B1 * 12/2003 Blanc et al. ..... 370/252
(Continued)

FOREIGN PATENT DOCUMENTS

EP 0679043 * 3/1995
EP 0863682 9/1998
(Continued)

OTHER PUBLICATIONS

3GPP Organisational Partners. (2005). "3rd Generation Partnership Project; Technical Specifications Group Radio Access Network; Medium Access Control (MAC) Protocol Specification (Release 6)," 3GPP TS 25.321 v6.7.0 (Dec. 2005), 3GPP Organisational Partners' Publications Office: Valbonne, France.
(Continued)

*Primary Examiner* — Mark Sager
(74) *Attorney, Agent, or Firm* — Finnegan, Henderson, Farabow, Garrett & Dunner, LLP

(57) ABSTRACT

A wireless communication system and method employing channel transport format allocation in a shared uplink channel between a UE and a Node B, and wherein the UE can determine a transport format combination which it can support, by: detecting in the UE a change in transport format combination that the UE can support; and sending to the Node B an indication of transport format combination that the UE can support, whereby efficiency of channel transport format allocation in the system may be improved. A conditional delay mechanism may be employed to reduce signalling overhead. This allows uplink shared channels to be
(Continued)

efficiently used by providing a means by which UTRAN (UMTS terrestrial radio access network) is informed of the TFCs within the TFCS which can he used in the uplink by the UE.

10 Claims, 4 Drawing Sheets

Related U.S. Application Data continuation of application No. 12/770,172, filed on Apr. 29, 2010, now Pat. No. Re. 44,576, which is an application for the reissue of Pat. No. 7,366,094.

(58) Field of Classification Search
USPC ..... 370/230, 465, 235
See application file for complete search history.

(56) References Cited

U.S. PATENT DOCUMENTS

| | | | | |
|---|---|---|---|---|
| 6,813,284 | B2 | 11/2004 | Vayanos et al. | |
| 6,826,193 | B1 * | 11/2004 | Peisa | 370/437 |
| 6,828,193 | B2 * | 12/2004 | Chen et al. | 438/255 |
| 6,845,100 | B1 * | 1/2005 | Rinne | 370/395.43 |
| 6,850,540 | B1 * | 2/2005 | Peisa et al. | 370/468 |
| 6,904,290 | B1 | 6/2005 | Palenius | |
| 6,928,268 | B1 | 8/2005 | Kroner | |
| 6,944,453 | B2 * | 9/2005 | Faerber et al. | 455/436 |
| 6,999,432 | B2 | 2/2006 | Zhang et al. | |
| 7,043,244 | B1 | 5/2006 | Fauconnier | |
| 7,076,005 | B2 * | 7/2006 | Willenegger | 375/341 |
| 7,106,694 | B1 * | 9/2006 | Salonen et al. | 370/230 |
| 7,206,332 | B2 | 4/2007 | Kwan et al. | |
| 7,227,851 | B1 | 6/2007 | Gopalakrishnan et al. | |
| 2005/0152398 | A1 * | 7/2005 | Shin | 370/469 |

FOREIGN PATENT DOCUMENTS

| | | | |
|---|---|---|---|
| EP | 0863682 | A1 | 9/1998 |
| WO | WO 200054444 | | 9/2000 |
| WO | WO-01/03446 | A3 | 1/2001 |
| WO | WO-01/03448 | A2 | 1/2001 |
| WO | WO 200103448 | | 1/2001 |

OTHER PUBLICATIONS

Final Rejection, U.S. Appl. No. 10/190,458 (issued as U.S. Pat. No. 7,366,094), dated Apr. 20, 2007.
GB Examination Report dated Jan. 26, 2005 for GB Patent Application No. 0116555.4, 2 pages.
Non-Final Rejection, U.S. Appl. No. 10/190,458 (issued as U.S. Pat. No. 7,366,094), dated Aug. 8, 2006.
Notice of Allowance, U.S. Appl. No. 10/190,458 (issued as U.S. Pat. No. 7,366,094), dated Dec. 14, 2007.
3GPP Organisational Partners. (2005). "3rd Generation Partnership Project; Technical Specification Group Radio Access Network; MAC protocol specification (Release 4)," 3GPP TS 25.321 v4.0.0 (Mar. 2001), 3GPP Organisational Partners' Publications Office: Valbonne, France.
Non-Final Rejection, U.S. Appl. No. 12/770,172 (issued as U.S. Re. 44,576), dated Oct. 7, 2011.
Final Rejection, U.S. Appl. No. 12,770,172 (issued as U.S. Re. 44,576), dated Sep. 21, 2012.
Ex-Parte Quayle Action, U.S. Appl. No. 12/770,172 (issued as U.S. Re. 44,576), dated Mar. 7, 2013.
Notice of Allowance, U.S. Appl. No. 12/770,172 (issued as U.S. Re. 44,576), dated Jun. 25, 2013.
3GPP Organisational Partners. (2005). "3rd Generation Partnership Project; Technical Specification Group Radio Access Network; Medium Access Control (MAC) Protocol Specification (Release 6)," 3GPP TS 25.321 v6.7.0 (Dec. 2005), 3GPP Organisational Partners' Publications Office: Valbonne, France, pp. 1-2, 50-55.
GB Examination Report mailed on Jan. 26, 2005 for GB patent application No. 0116555.4, 2 pages.

* cited by examiner

SYSTEM AND METHOD FOR CHANNEL TRANSPORT FORMAT ALLOCATION IN A WIRELESS COMMUNICATION SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*Notice: More than one reissue application has been filed for the reissue of U.S. Pat. No. 7,366,094. The reissue application numbers are Ser. Nos. 14/069,025, 12/770,172, 15/170,376, 15/170,533, and the present application.*

CROSS-REFERENCE TO RELATED APPLICATIONS

[This application claims the benefit of UK application GB 0116555.4 filed, Jul. 6, 2001, titled "Channel transport format allocation in a wireless communication system" by Timothy James Speigth IPWireless, Inc., the contents of which are incorporated herein by reference.]

*This application is a continuation reissue of U.S. patent application Ser. No. 14/069,025, filed Oct. 31, 2013, which is a continuation reissue of U.S. patent application Ser. No. 12/770,172 filed Apr. 29, 2010 (now Reissue Pat. No. RE44,576, issued Nov. 5, 2013), which is a reissue of U.S. patent application Ser. No. 10/190,458, filed Jul. 5, 2002 (issued as U.S. Pat. No. 7,366,094 on Apr. 29, 2008), which claims the benefit of UK application GB 0116555.4, filed Jul. 6, 2001, the contents of all of which are incorporated herein by reference.*

FIELD OF THE INVENTION

This invention relates generally to communication systems, and particularly (though not exclusively) to '3GPP Standard' communication systems when uplink shared channels are employed.

BACKGROUND OF THE INVENTION

In the field of this invention it is known that the '3GPP Standard' (the evolving standard for UMTS—Universal Mobile Telecommunication System) allows user equipment—UE—(e.g., a mobile cellular telephone) to autonomously select the transport format combination (TFC). The transport format combinations available to the UE will typically represent different throughputs. Generally, the TFCs which are associated with higher throughputs require larger amounts of physical resources (i.e., more codes with lower spreading factors), The UE will be signalled with the transport format combination set (TFCS) which defines a number of TFCs, The 'layer 1' 410 (FIG. 4) processes (governing physical channel allocation and control) in the user equipment (UE) will determine the power required to support these TFCs (all the TFCs in the TFCS) and will decide which ones can be used and which require more power than is available and therefore cannot he used.

Layer 1 410 (FIG. 4) then signals the available TFCs to medium access control (MAC), MAC 415 (FIG. 4) then determines which of the available TFCs will be used.

When a dedicated channel (DCH) is allocated to a user, it is clearly not possible to reallocate physical resources that have been allocated to this user hut are not used because of the selected TFC.

However, when shared channels are employed in the uplink it is beneficial to allocate only the necessary amount of physical resource (number and spreading factor of channelisation codes) that a UE can utilize. This is because the resources that could not be used can he reallocated to other users, in addition, when the UE, can exploit more physical resources (use a higher TFC) it is advantageous to know this in order to provide the highest user throughputs.

Unfortunately, prior art systems do not allow these two techniques to be used.

A need therefore exists for the abovementioned disadvantage(s) to be alleviated.

STATEMENT OF INVENTION

In accordance with a first aspect of the present invention there is provided a wireless communication system employing channel transport format allocation between a radio unit and a base station of the system, and wherein the radio unit can determine a transport format combination which it can support, the system comprising: TFC change detection means for detecting in a radio unit a change in transport format combination that the radio unit can support; and indication means responsive to the TFC change detection means for sending to the base station an indication of transport format combination that the radio unit can support, whereby efficiency of channel transport format allocation in the system may be improved.

In accordance with a second aspect of the present invention there is provided a method in a wireless communication system for channel transport format allocation between a radio unit and a base station of the system, in which the radio unit can determine a transport format combination which it can support, the system comprising: detecting in a radio unit a change in transport format combination that the radio unit can support; and sending, responsive to detecting, to the base station an indication of transport format combination that the radio unit can support, whereby efficiency of channel transport format allocation in the system may be improved.

In accordance with a third aspect of the present invention there is provided a radio unit for use in a wireless communication system employing channel transport format allocation between the radio unit and a base station of the system, wherein the radio unit can determine a transport format combination which it can support, the radio unit comprising: TFC change detection means for detecting a change in transport format combination that the radio unit can support; and indication means responsive to the TFC change detection means for sending to the base station an indication of transport format combination that the radio unit can support, whereby efficiency of channel transport format allocation in the system may be improved.

BRIEF DESCRIPTION OF THE DRAWINGS

One UMTS communication system supporting signalling of change of available TFCs in uplink shared channels incorporating the present invention will now be described, by way of example only, with reference to the accompanying drawings, in which.

DESCRIPTION OF PREFERRED EMBODIMENT

Figure 1:
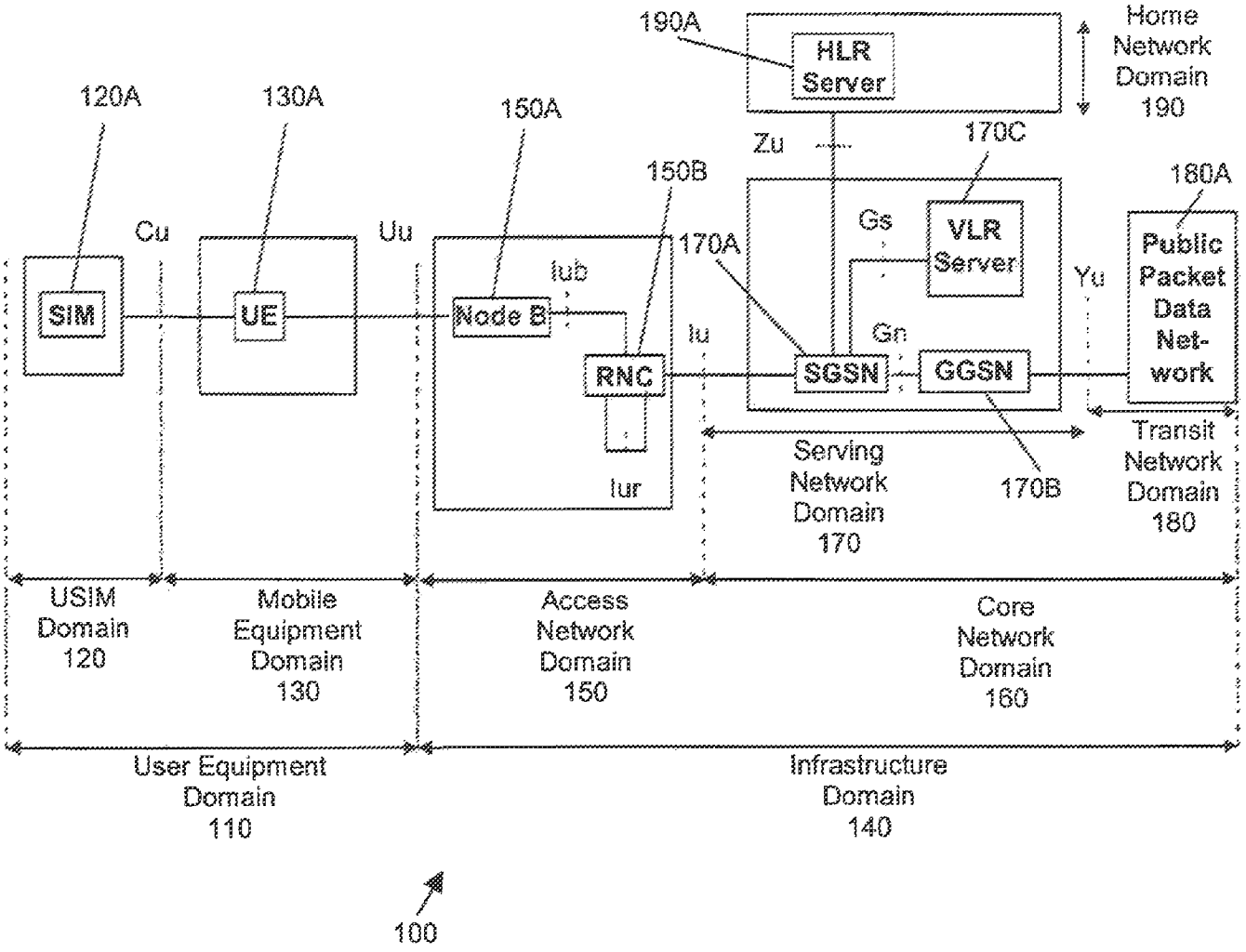
FIG. 1 shows a block diagrammatic representation of a UMTS system in which the present invention is used.

Referring firstly to FIG. 1, a typical, standard UMTS network (100) is conveniently considered as comprising: a user equipment domain (110), made up of a user SIM (USIM) domain (120) and a mobile equipment domain (130); and an infrastructure domain (140), made up of an access network domain (150), and a core network domain (160), which is in turn made up of a serving network domain (170) and a transit network domain (180) and a home network domain (190).

In the mobile equipment domain (130), user equipment UE (130A) receives data from a user SIM (120A) in the USIM domain 120 via the wired Cu interface. The UE (130A) communicates data with a Node B (150A) in the network access domain (150) via the wireless Uu interface. Within the network access domain(150), the Node B (150A) communicates with an RNC (150B) via the lub interface. The RNC (150B) communicates with other RNC's (not shown) via the Iur interface. The RNC (150B) communicates with a SGSN (170A) in the serving network domain (170) via the In interface. Within the serving network domain (170), the SGSN (170A) communicates with a GGSN (170B) via the Gn interface, and the SGSN (170A) communicates with. a VLR server (170C) via the Ga interface. The SGSN (170A) communicates with an HLR server (190A) in the home network domain (190) via the Zu interface. The GGSN (170B) communicates with public data network (180A) in the transit network domain (180) via the Yu interface.

Thus, the elements RNC (150B), SGSN (170A) and GGSN (170B) are conventionally provided as discrete and separate units (on their own respective software/hardware platforms) divided across the access network domain (150) and the serving network domain (170), as shown the FIG. 1.

The RNC (150B) is the UTRAN (UMTS Terrestrial Radio Access Network) element responsible for the control and allocation of resources for numerous Node B's (150A); typically 50 to 100 Node B's may be controlled by one RNC. The RNC also provides reliable delivery of user traffic over the air interfaces. RNC's communicate with each other (via the interface Iur) to support handover and macrodiversity.

The SGSN (170A) is the UMTS Core Network element responsible for Session Control and interface to the Location Registers (HLR and VLR). The SGSN is a large centralised controller for many RNCs.

The GGSN (170B) is the UMTS Core Network element responsible for concentrating and tunnelling user data within the core packet network to the ultimate destination (e.g., internet service provider—ISP).

Consider the following signalling and channel allocation procedure that may take place in use of the system. A transport format combination set (TFCS) is signalled to the UE 130A, containing 3 TFCs. The TFCs are mapped to a single channelisation code with spreading factors (SF) 16, 8, and 4. A PHYSICAL SHARED CHANNEL ALLOCATION message allocates the UE a single channelisation code at SF4, but layer 1 410 (FIG. 4) at the UE determines that the estimated power needed for this TFC is greater than the maximum UE transmitter power due to limited UE TX transmitter capability, and so this TFC is indicated as not available to the MAC 415 (FIG. 4) TFC selection algorithm. Consequently MAC 415 (FIG. 4) selects the TFC mapped to a single channelisation code at SF8. It is clear that in these circumstances system resources are wasted. Since this is a shared channel rather than a dedicated channel, it is important for higher layers to know about this situation as the additional resource space (2 resource units) could be allocated to other users.

Not only is it necessary to know that only an SF8 is selected (and therefore there are spare physical resources), it is additionally necessary to know if, at a later date, the UE can exploit an SF4 (higher throughput).

Figure 4:
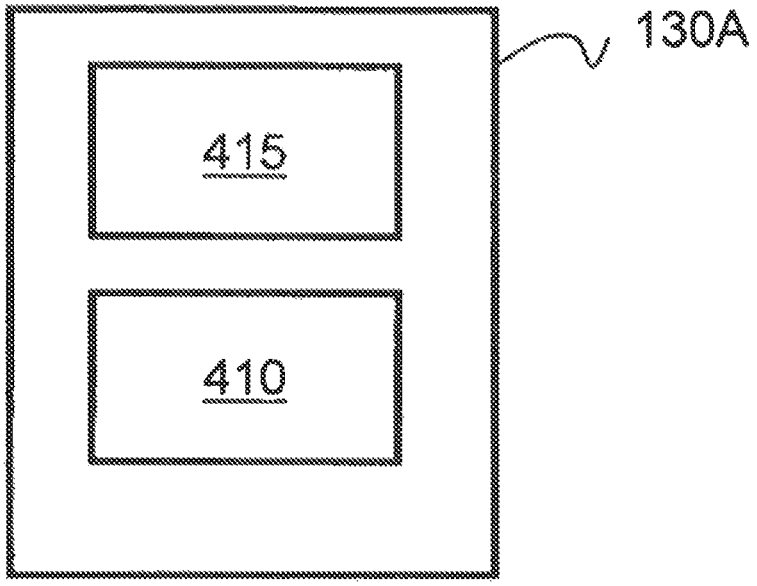
FIG. 4 shows a graphical representation of a UE including a MAC and a layer 1 according to embodiments of the invention.

In accordance with the present invention, a new RRC measurement, which is conveniently added to the UE internal measurements set defined 3GPP, is used. This measurement is triggered when there is a change to the available TFCs that are indicated to MAC 415 (FIG. 4) from layer 1 410 (FIG. 4).

Figure 2:
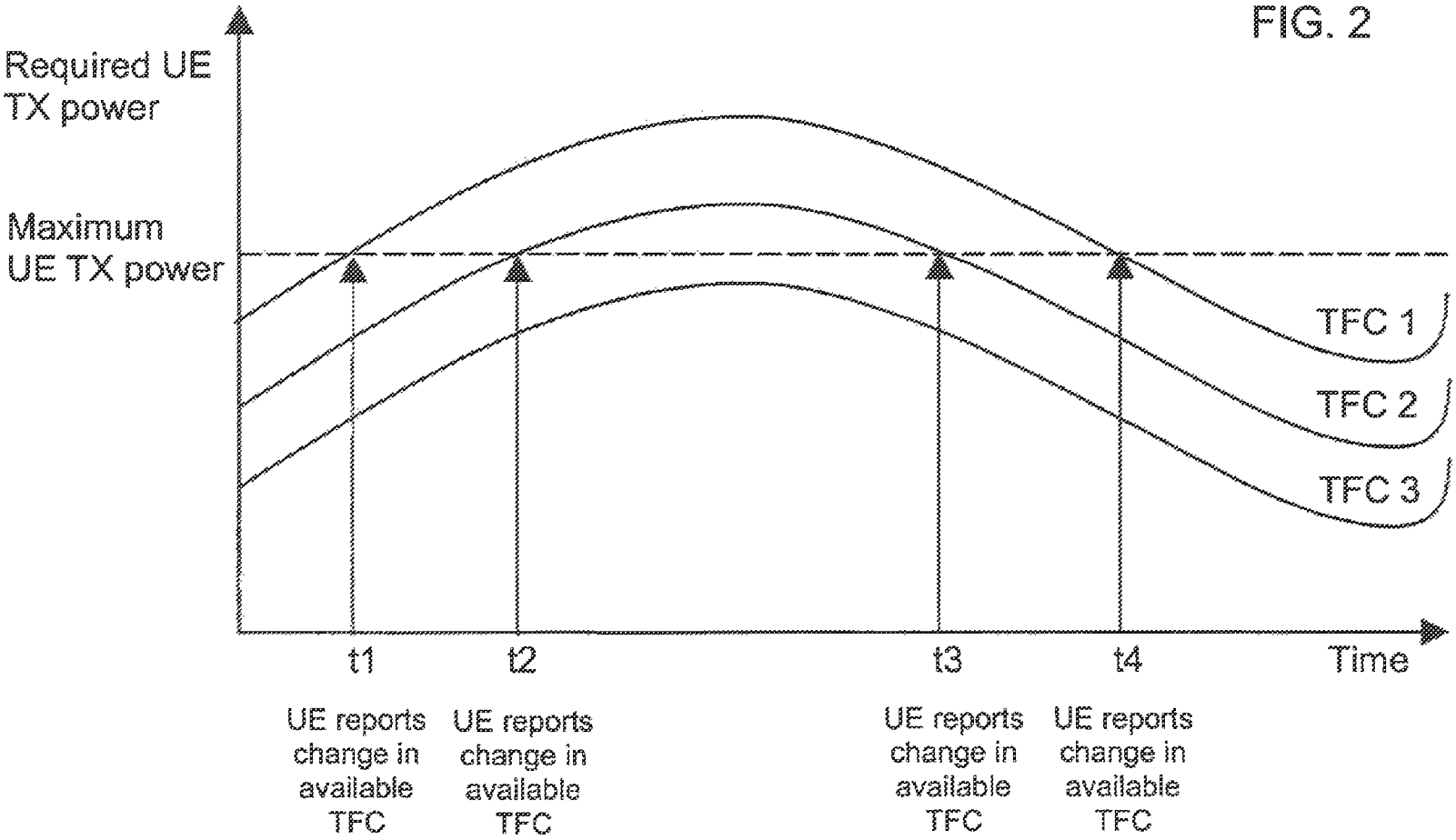
FIG. 2 shows a graphical representation of variation of required UE TX power of three TFCs over time, illustrating when the UE may report change in available TFC.

The triggering of this report is illustrated in FIG. 2. As can be seen, at time t1 the required UE TX power for TFC 1 exceeds the maximum available UE TX power and the UE reports change in available TFC. Next, at time t2 the required UE TX power for TFC 2 exceeds the maximum available UE TX power and the UE reports change in available TFC. Then, at time t3 the required UE TX power for TFC 2 falls below the maximum available UE TX power and the UE reports change in available TFC. Finally, at time t4 the required UE TX power for TFC 1 falls below the maximum available UE TX power and the UE reports change in available TFC.

Figure 3:
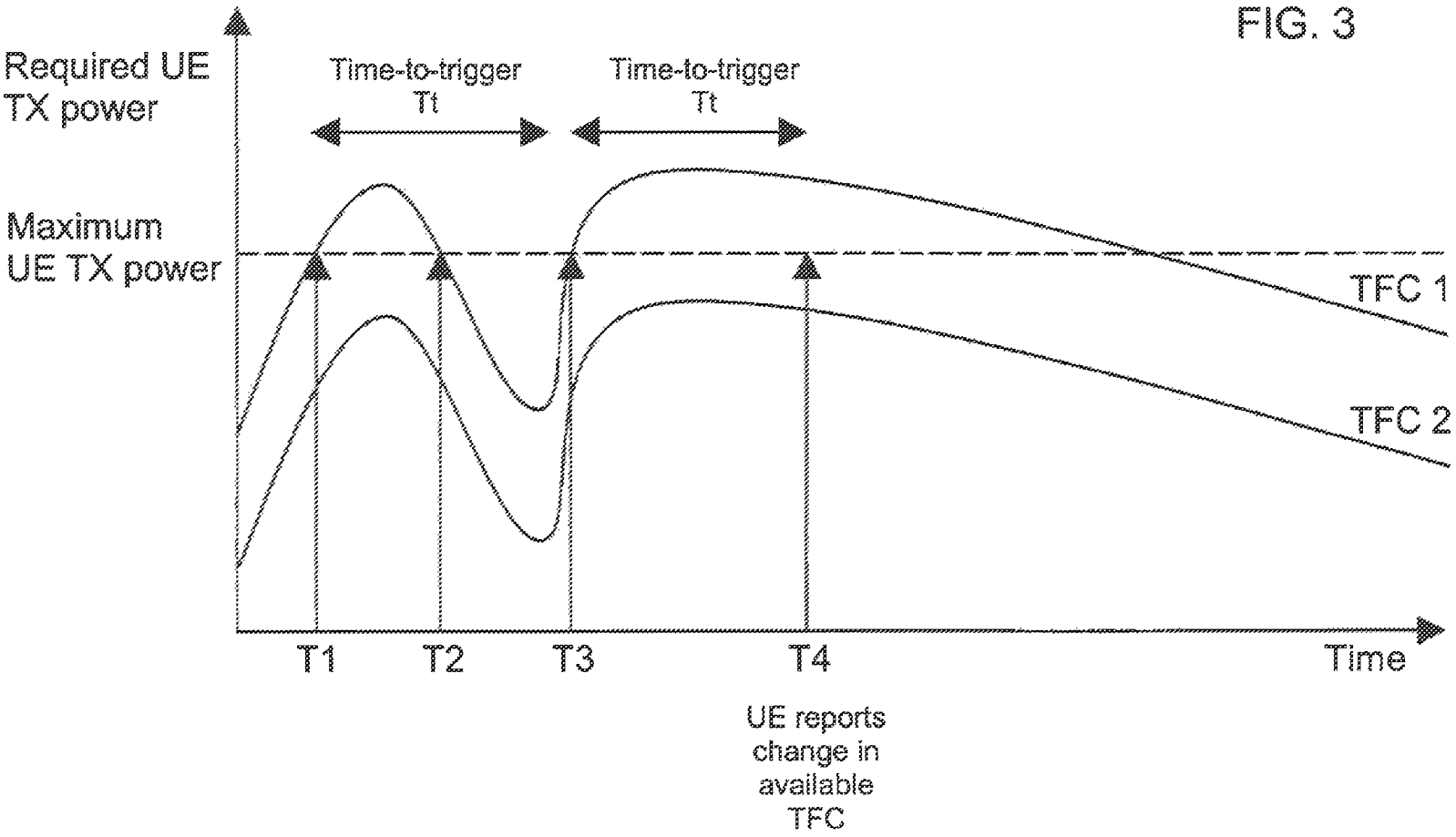
FIG. 3 shows a graphical representation of variation of required UE TX power of two TFCs over time, illustrating when the UE may report change in available TFC by using a time-to-trigger parameter to reduce signalling overhead.

The measurement can be filtered by use of a time-to-trigger parameter so as not to generate excessive measurement reports when the available TFCs change rapidly. That is to say, the available TFCs must change for Tt seconds (the value of the time-to-trigger parameter) continuously before the measurement report is sent, FIG. 3 shows how the use of the time-to-trigger parameter modifies the reports generated by the UE when four threshold crossings events occur at times T1, T2, T3 and T4, similarly to the four threshold crossings events at times t1 , t2, t3 and t4 in FIG. 2. As can be seen in FIG. 3, at time T1 the required UE TX power for TFC 1 exceeds the maximum available UE TX power and (rather than the UE immediately reporting change in available TFC) a time-to -trigger timer (not shown) is started. At time T2 the required UE TX power for TFC 1 falls below the maximum available UE TX power and the timer is reset. At time T3 the required UE TX power for TFC 1 exceeds the maximum available UE TX power and the time-to-trigger timer is again started, After a further period of time Tt when the time-to-trigger timer expires the required UE TX power for TFC 1 still exceeds the maximum available UE TX power and so at this time the UE reports change in available TFC. It will thus be appreciated that use of the time-to-trigger parameter avoids the UE reporting change in available TFC on three of the four possible occasions (T1, T2 and T3) when it would have occurred without its use, and on only the fourth occasion (T4) does the UE reporting change in available TFC, reducing the signalling overhead by 75%.

The measurement report generated when this measurement is triggered contains the calculated transport format combinations (CTFC) of the available TFCs in the TFCS. The UTRAN can map these CTFC to physical resource and can then allocate physical resource appropriately.

The measurement is only used when the UE is in cell_DCH state.

Example of operation:

Assuming the following

TFCSid=1 contains 3 TPCs,

TFC 1—maps to single code at SF4

TFC 2—maps to single code at SF8

TFC 3—maps to single code at SF16

The following steps describe briefly the operation of the new measurement report:

1. UE is in cell_DCH slate (operating with an assigned dedicated channel).
2. UE requests uplink resource by sending PUSCH (Physical Uplink Shared CHannel) CAPACITY REQUEST message.
3. UTRAN responds with PHYSICAL, SHARED CHANNEL ALLOCATION message which allocates a single code at SF4 (enough resource for TFC1) for a number of frames and TFCSid=1.
4. UE RRC configures layer 1 410 (FIG. 4) and MAC 415 (FIG. 4) with the information indicated by the PHYSICAL SHARED CHANNEL ALLOCATION message.
5. UE determines that it cannot employ TFC1 due to lack of UE TX power (TFC 2 and TFC 3 can be used). Consequently the available TFCs reported from layer 1 410 (FIG. 4) to MAC 415 (FIG. 4) changes and a measurement report is triggered which contains the CTFC of available TFC.
6. UTRAN now knows of this power control limit on available TFCs so further PHYSICAL SHARED CHANNEL ALLOCATION messages to this UE are for a single code at SF8. The additional 2 resource units, freed up by only allocating a single code at SF8, are allocated to other UEs.
7. Channel conditions improve the UE and the available TFCs reported from layer 1 410 (FIG. 4) to MAC 415 (FIG. 4) increases to include TFC1. A measurement report is generated and consequently UTRAN now knows that this UE can handle TFC1. It is important that this UE is provided with the highest rate possible (for example, this UE may be on a high-priced tariff which guarantees high throughputs), so in further allocations UTRAN does not share out the 2 resource units freed up in the step above amongst other users but allocates them to this UE. Thus, subsequent PHYSICAL SHARED CHANNEL ALLOCATION messages allocate a single code at SF4.

It will be appreciated that the system and methods described above will typically be performed by computer software program(s), in the user equipment and/or else where in the system, which may be transferred on computer readable data carriers such as magnetic or optical disks (not shown).

It will be understood that the method of signalling change of available TFCs in uplink shaved channels described above provides the following advantages: The invention allows uplink shared channels to be efficiently used by providing a means by which UTRAN is informed of the TFCs within the TFCS which can be used in the uplink by the UE.

This enables:

Spare shared channel physical resources to be allocated to other shared channel users, so increasing overall throughput.

The user to be provided when appropriate with the highest possible uplink rate that can from time to time be supported.

The invention claimed is:

[1. A method for a wireless communication system using transport format combinations (TFC) for allocating bandwidth of a shared channel among a plurality of radio units in the system, the method comprising:

receiving, at a radio unit, a transport format combination set (TFCS) including a transport format combination (TFC) allocated for use by the radio unit for data transmission;

detecting in the radio unit that the radio unit can support a TFC within the TFCS different from the allocated TFC; and sending, responsive to detecting, to the base station an indication of the transport format combination in the TFCS that the radio unit can support.]

[2. The method as claimed in claim 1, further comprising, conditionally delaying sending the indication, until the detected change in transport format combination that the radio unit can support has lasted for more than a predetermined period of time.]

[3. The method as claimed in claim 1 , wherein the allocated TFC reflects an allocation of an uplink shared channel among the plurality of radio units in the system.]

[4. The method as claimed in claim 1, wherein the radio unit is part of a UMTS system.]

[5. The method as claimed in claim 4, wherein the step of detecting comprises:

indicating from physical interface circuitry to medium access control circuitry a change in transport format combination that the radio unit can support.]

[6. The method as claimed in claim 5, wherein the step of indicating comprises providing, to the base station, calculated transport format combinations that the radio unit can support.]

[7. A wireless unit for data transmission on an unlink channel shared with other wireless units, the uplink channel shared by allocating a transport format combination (TFC) to the wireless unit from a basestation, the wireless unit comprising:

physical interface circuitry configured to detect Transport Format Combinations (TFCs) that the wireless unit can use; and media access control circuitry configured to receive, from the physical interface circuitry, an indication of the TFCs that the wireless unit can use, and to select, for uplink transmission, a TFC from the TFCs that the wireless unit can use, and wherein the media access control circuitry is also configured to provide: an indication to the basestation if the selected TFC, is not the allocated TFC from the basestation.]

[8. The wireless unit of claim 7, further comprising a timer configured to prevent transmission of the indication to the basestation unless the detected change has continued for at least a predetermined period of time.]

[9. The wireless unit of claim 7, wherein the wireless unit is configured to operate in a UMTS system.]

[10. The wireless unit of claim 7, wherein the physical interface circuitry is configured to provide calculated TFCs as the indication provided to the media access controller circuitry.]

[11. A computer readable medium comprising program code for a method of allocating bandwidth of a shared wireless medium, the method comprising:

receiving, in a radio unit and from a controller, a transport format combination representative of an allocation of a shared uplink channel;

detecting, in the radio unit, a change in Transport Format Combinations (TFC) that the radio unit can use for an uplink transmission; and indicating the TFC change to the controller so that the controller can use the indication for reallocating the shared uplink channel.]

[12. A computer readable medium comprising program code for a method to be implemented in a controller for a wireless communications network that provides for uplink transmissions from a plurality of wireless units on a shared channel, the method comprising;

formulating a first set of transport format combinations (a TFCS), for transmission to a wireless unit of the plurality, the first TFCS reflecting an allocation of the shared channel among the plurality of wireless units, and including an initially allocated TFC for uplink transmission by the wireless unit;

transmitting the first TFCS to the wireless unit;

receiving an indication from the wireless unit that a calculated set of TFCs that the wireless unit can use for an uplink transmission differs from the initially allocated TFC in the first TFCS; and modifying the allocation of the shared channel among the wireless units in response to the indication.]

[13. The computer readable medium of claim 12, the stored method further comprising:

determining, based on the indication, that the initially allocated TFC provides a bandwidth higher than what the wireless unit can presently use; and further comprising reallocating, to other wireless units of the plurality, a difference in bandwidth reflected by the highest bandwidth TFC in the calculated set of TFC and the initially allocated TFC is the first TFCS.]

[14. The computer readable medium of claim 12, the stored method further comprising:

determining, based on the indication, that the wireless unit can use a higher bandwidth TFC in the first TFCS than the initially allocated TFC; and allocating the higher bandwidth TFC to the wireless unit.]

*15. A computer readable medium comprising program code for a method performed by a user equipment (UE), the method comprising:*

*sending a message to a wireless network requesting an uplink resource;*

*sending data using a first uplink transmission format;*

*determining, based on an improvement of a channel condition, if a second uplink transmission format is available for a predetermined time period continuously, wherein the second uplink transmission format has a higher data rate than the first uplink transmission format;*

*in response to determining the second uplink transmission format is available for a predetermined time period continuously, sending an indication that a higher data rate uplink transmission format is supported; and*

*receiving, from the wireless network in association with the indication, an allocation of uplink resources.*

*16. The computer readable medium of claim 15, wherein the determination of the second uplink transmission format availability occurs over a plurality of time intervals.*

*17. The computer readable medium of claim 15, wherein the allocation of uplink resources is for an uplink shared channel.*

*18. A method performed by a user equipment (UE), the method comprising:*

*sending a message to a wireless network requesting an uplink resource;*

*sending, by the UE, data using a first uplink transmission format;*

*determining, by the UE and based on an improvement of a channel condition, if a second uplink transmission format is available for a predetermined time period continuously, wherein the second uplink transmission format has a higher data rate than the first uplink transmission format;*

*in response to determining the second uplink transmission format is available for a predetermined time period continuously, sending, by the UE, an indication that a higher data rate uplink transmission format is supported;*

*receiving, by the UE from the wireless network in association with the indication, an allocation of uplink resources.*

*19. The method of claim 18, wherein the determination of the second uplink transmission format availability occurs over a plurality of time intervals.*

*20. The method of claim 18, wherein the allocation of uplink resources is for an uplink shared channel.*

*21. A computer readable medium comprising program code for a method performed by a wireless network, the method comprising:*

*receiving a message from a user equipment (UE) requesting an uplink resource;*

*sending, to the UE, a first resource allocation message indicating a first uplink transmission format for the UE;*

*receiving data sent by the UE using the first uplink transmission format;*

*receiving, from the UE, an indication that a higher data rate uplink transmission format is supported, wherein the UE determines that the higher data rate uplink transmission format is supported for a predetermined time period continuously based on an improvement of a channel condition; and*

*sending, in response to the indication, a second resource allocation message to the UE indicating a second uplink transmission format, wherein the second uplink transmission format has a higher data rate than the first uplink transmission format.*

*22. The computer readable medium of claim 21, wherein each of the first uplink transmission format and the second uplink transmission format is associated with an uplink shared channel.*

*23. A method performed by a wireless network, the method comprising:*

*receiving a message from a user equipment (UE) requesting an uplink resource;*

*sending, to the UE, a first resource allocation message indicating a first uplink transmission format for the UE;*

*receiving data sent by the UE using the first uplink transmission format;*

*receiving, from the UE, an indication that a higher data rate uplink transmission format is supported, wherein the UE determines that the higher data rate uplink transmission format is supported for a predetermined time period continuously based on an improvement of a channel condition; and*

*sending, in response to the indication, a second resource allocation message to the UE indicating a second*

*uplink transmission format, wherein the second uplink transmission format has a higher data rate than the first uplink transmission format.*

*24. The method of claim 23, wherein each of the first uplink transmission format and the second uplink transmission format is associated with an uplink shared channel.*

* * * * *